US012578445B2

(12) United States Patent
Kotzer et al.

(10) Patent No.: US 12,578,445 B2
(45) Date of Patent: Mar. 17, 2026

(54) VISION BASED METHODS FOR DIRECTIONAL ANTENNA BORESIGHT ALIGNMENT

(71) Applicant: GM Global Technology Operations LLC, Detroit, MI (US)

(72) Inventors: Igal Kotzer, Tel Aviv (IL); Tzvi Philipp, Bet Shemeseh (IL); Michael Lawrence Mandziuk, Clarkston, MI (US); Ofer Givati, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 198 days.

(21) Appl. No.: 18/626,800

(22) Filed: Apr. 4, 2024

(65) Prior Publication Data

US 2025/0314753 A1 Oct. 9, 2025

(51) Int. Cl.
*G01S 7/497* (2006.01)
*G01S 7/484* (2006.01)

(52) U.S. Cl.
CPC .............. *G01S 7/497* (2013.01); *G01S 7/484* (2013.01)

(58) Field of Classification Search
CPC .................................. G01S 7/497; G01S 7/484
See application file for complete search history.

(56) References Cited

U.S. PATENT DOCUMENTS 3,550,142 A * 12/1970 Dawson .............. H01Q 19/132
343/915

FOREIGN PATENT DOCUMENTS

EP 607906 A1 * 7/1997

* cited by examiner

*Primary Examiner* — Kiho Kim
(74) *Attorney, Agent, or Firm* — CANTOR COLBURN LLP

(57) ABSTRACT

A testing system includes an antenna assembly having a directional antenna, the alignment of which can be adjusted with respect to a device under test. The directional antenna includes a horn having a housing having a side piece with an opening. A reflecting surface is movable through the opening from a first position away from a beam axis of the directional antenna to a second position along the beam axis. A light source is configured to transmit a light beam to be incident on the reflecting surface. The light beam reflects at the reflecting surface to project along the beam axis to the device under test. A mounting stage coupled to the directional antenna can be adjusted to align the directional antenna by placing the light beam at a desired location of the device under test.

20 Claims, 6 Drawing Sheets

100

101

114

104

110

102

108

106

112

VISION BASED METHODS FOR DIRECTIONAL ANTENNA BORESIGHT ALIGNMENT

INTRODUCTION

The subject disclosure relates to the use of directional antennas in testing environments and, in particular, to a system and method for aligning a directional antenna using a calibration device.

A directional antenna can be used to obtain various measurements with respect to a device under test. A testing system can include the directional antenna disposed on a mast. calibration of the directional antenna generally involves adjusting an alignment of the directional antenna with respect to the device under test. Such alignment can be hindered due to the required accuracy being difficult to achieve without a suitable marker to signal correct alignment. Accordingly, it is desirable to provide a method for aligning a directional antenna with respect to the device under test in such a testing system.

SUMMARY

In one exemplary embodiment, a method of adjusting an alignment of a directional antenna is disclosed. A reflecting surface is moved from a first position away from a beam axis of a horn of the directional antenna to a second position along the beam axis. A light beam is transmitted from a light source to be incident on the reflecting surface, wherein the light beam reflects at the reflecting surface to project along the beam axis to a device under test. The alignment of the directional antenna is adjusted to place the light beam at a desired location of the device under test.

In addition to one or more of the features described herein, the method further includes receiving a reflection of the light beam from the device under test at the reflecting surface, directing the reflection via the reflecting surface to a light sensor and adjusting the alignment based on an actual array position of the reflection of the light beam at the light sensor.

In addition to one or more of the features described herein, the method further includes measuring the actual array position within a light-sensitive array of the light sensor and adjusting a pose parameter of the antenna to move the actual array position to a desired array position within the light-sensitive array.

In addition to one or more of the features described herein, the method further includes measuring a time-of-flight of the light beam and determining a path loss for an electromagnetic wave in air received from the device under test based on the time-of-flight.

In addition to one or more of the features described herein, the reflecting surface and the light source are included in an alignment calibration device and the method further includes inserting at least a part of the alignment calibration device through an opening in a side surface of the horn.

In addition to one or more of the features described herein, the directional antenna is coupled to a mounting stage and the method further includes adjusting at least one of a translational parameter of the directional antenna and a rotational parameter of the directional antenna at the mounting stage.

In addition to one or more of the features described herein, the mounting stage is coupled to a mast and the method further includes adjusting a vertical position of the directional antenna by moving the mounting stage vertically with respect to the mast.

In another exemplary embodiment, an antenna assembly is disclosed. The antenna assembly includes a directional antenna including a horn having an opening in a side of the horn, a reflecting surface movable through the opening from a first position away from a beam axis of the directional antenna to a second position along the beam axis, a light source configured to transmit a light beam to be incident on the reflecting surface, the light beam reflecting at the reflecting surface to project along the beam axis to a device under test, and a mounting stage for adjusting an alignment of the directional antenna to place the light beam at a desired location of the device under test.

In addition to one or more of the features described herein, the antenna assembly further includes a light sensor, wherein a reflection of the light beam from the device under test is directed from the reflecting surface to the light sensor and the mounting stage adjusts the alignment based on an actual array position of the reflection of the light beam at the light sensor.

In addition to one or more of the features described herein, the light sensor further includes a light-sensitive array, the actual array position is determined within the light-sensitive array and a pose parameter of the directional antenna is adjusted to move the actual array position to a desired array position within the light-sensitive array.

In addition to one or more of the features described herein, the antenna assembly further includes a processor configured to measure a time-of-flight of the light beam and determine a path loss for an electromagnetic wave in air received from the device under test based on the time-of-flight.

In addition to one or more of the features described herein, the antenna assembly further includes an alignment calibration device that includes the reflecting surface and the light source, wherein at least a part of the alignment calibration device is insertable through an opening in a side surface of the horn.

In addition to one or more of the features described herein, the mounting stage is further configured to adjust at least one of a translational parameter of the directional antenna and a rotational parameter of the directional antenna.

In addition to one or more of the features described herein, the mounting stage is coupled to a mast and is further configured to move vertically with respect to the mast to adjust a vertical position of the directional antenna.

In yet another exemplary embodiment, a testing system is disclosed. The testing system includes a device under test, a directional antenna at a location with respect to the device under test, the direction antenna including a horn having an opening in a side of the horn, a reflecting surface movable through the opening from a first position away from a beam axis of the directional antenna to a second position along the beam axis, a light source configured to transmit a light beam to be incident on the reflecting surface, the light beam reflecting at the reflecting surface to project along the beam axis to the device under test, and a mounting stage for adjusting an alignment of the directional antenna to place the light beam at a desired location of the device under test.

In addition to one or more of the features described herein, the testing system further includes a light sensor, wherein a reflection of the light beam from the device under test is directed from the reflecting surface to the light sensor and the mounting stage adjusts the alignment based on an actual array position of the reflection of the light beam at the light sensor.

In addition to one or more of the features described herein, the light sensor further includes a light-sensitive array, the actual array position is determined within the light-sensitive array and a pose parameter of the directional antenna is adjusted to move the actual array position to a desired array position within the light-sensitive array.

In addition to one or more of the features described herein, the testing system further includes a processor configured to measure a time-of-flight of the light beam and determine a path loss for an electromagnetic wave in air received from the device under test based on the time-of-flight.

In addition to one or more of the features described herein, the testing system further includes an alignment calibration device that includes the reflecting surface and the light source, wherein at least a part of the alignment calibration device is insertable through an opening in a side surface of the horn.

In addition to one or more of the features described herein, the mounting stage is further configured to adjust at least one of a translational parameter of the directional antenna and a rotational parameter of the directional antenna.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
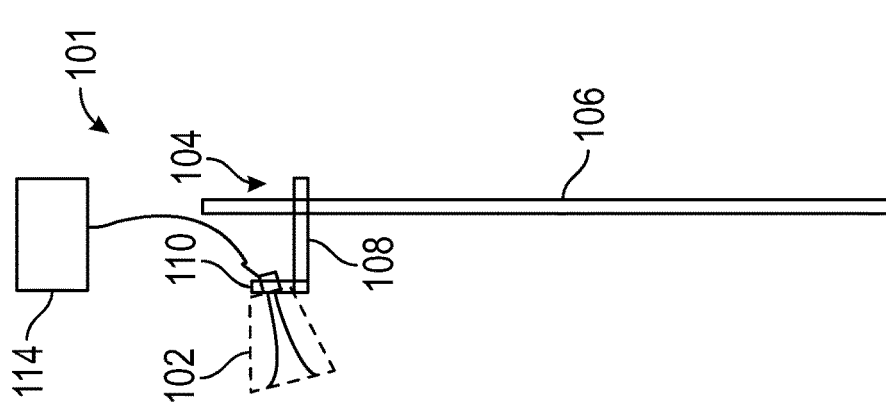
FIG. 1 shows a testing system for a device under test based on electromagnetic radiation received from the device under test, in accordance with an exemplary embodiment.
Figure 1:
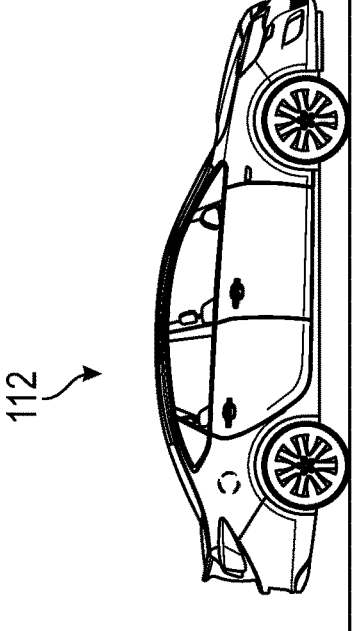

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a testing system 100 for a device under test 112 based on electromagnetic radiation received from the device under test. The testing system 100 includes an antenna assembly 101 that includes a directional antenna 102 disposed on a support structure 104. For illustrative purposes, the support structure 104 includes a mast 106, a cross arm 108 and a mounting stage 110. The mounting stage 110 is connected to the mast 106 via the cross arm 108. The cross arm 108 includes a mechanism for securing the cross arm 108 to the mast 106 and which allows the cross arm to move to different vertical positions along the mast 106. The mounting stage 110 is coupled to the cross arm 108 and the directional antenna 102 is mounted on the mounting stage 110. The mounting stage 110 is able to move the directional antenna 102 along six degrees of freedom, defined by translational parameters (x, y, z) and rotational parameters $(\theta_x, \theta_y, \theta_z)$. A processor 114 can control operation of the mounting stage 110 to adjust an alignment of the directional antenna 102. The mounting stage 110 can communicate its pose coordinates (i.e., at least one of the translational parameters and the rotational parameters) to the processor 114, which can send a signal to the mounting stage for adjusting an alignment of the directional antenna 102 by adjusting one or more of the pose parameters. The processor 114 can adjust a height of the directional antenna 102 by moving the cross arm 108 vertically with respect to the mast 106. The other pose parameters can be adjusted at the mounting stage 110.

When performing a test, the directional antenna 102 is pointed at a device under test 112 and an electromagnetic wave is recorded by the directional antenna from the device under test. The device under test 112 is exercised through multiple modes of operation while a set of time and frequency domain characteristics of the electromagnetic wave is recorded at a receiver and processed to obtain data regarding the device under test 112. In various embodiments, the characteristics of the electromagnetic wave can be recorded via the directional antenna 102.

Figure 2:
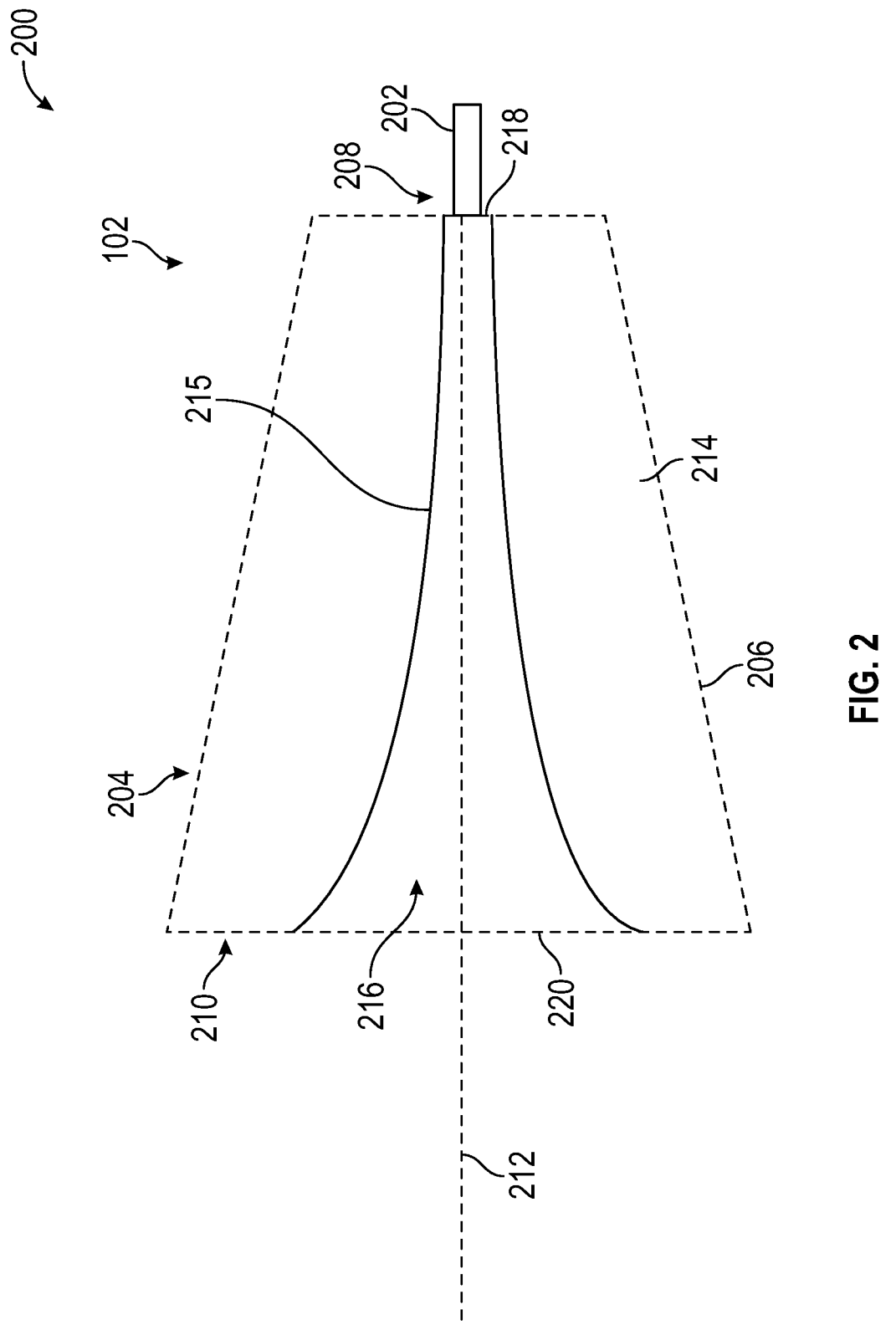
FIG. 2 shows a side cross-sectional view of a directional antenna of the testing system, in an illustrative embodiment.

FIG. 2 shows a side cross-sectional view 200 of the directional antenna 102, in an illustrative embodiment. The directional antenna 102 includes a transducer 202 and a horn 204 that is coupled to the transducer for directing an electromagnetic wave transmitted by the transducer 202. The horn 204 can also direct a received electromagnetic wave toward the transducer 202. The horn 204 is a waveguide that includes a housing 206. The housing 206 extends from a first end 208 to a second end 210 along a beam axis 212. The first end 208 includes a first aperture 218 and the second end 210 includes a second aperture 220 greater than the first aperture 218. The horn 204 can have a rotational symmetry about the beam axis 212. The housing 206 includes one or more side pieces 214 that form the sides of the housing. The side pieces 214 include inner surfaces 215 which define a passage 216 that extends from the first end 208 to the second end 210 along the beam axis 212. The inner surfaces 215 diverge in the direction moving from the first end 208 to the second end 210, causing a cross-section of the passage 216 perpendicular to the beam axis 212 to expand in the direction moving from the first end 208 to the second end 210. The specific design and shape and material of the horn 204 is tuned to receive electromagnetic waves in a selected range of radio or microwave wavelengths.

The transducer 202 is disposed at the first end 208 of the horn 204. An electromagnetic wave transmitted by the transducer 202 enters the horn 204 at the first aperture 218, travels along the beam axis 212 and exits the horn at the second aperture 220. A reflection of the transmitted light enters the horn 204 at the second aperture 220 along the beam axis 212 and is directed to the first aperture 218 and then to transducer 202.

Figure 3:
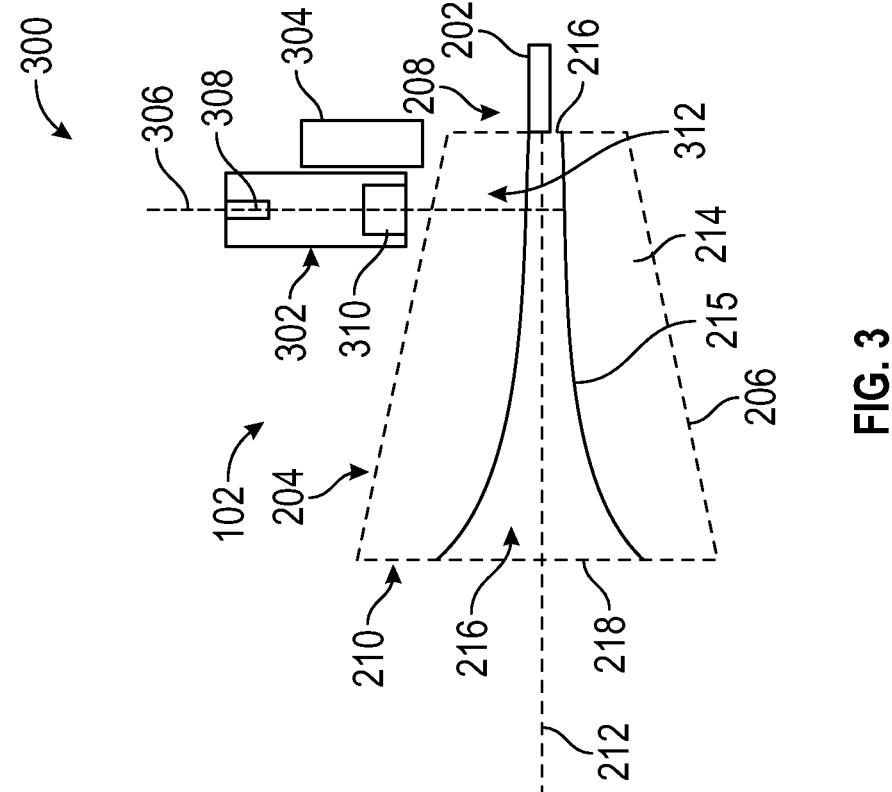
FIG. 3 shows a side cross-sectional view of the directional antenna that includes an alignment calibration device in a first position.

FIG. 3 shows a side cross-sectional view 300 of the directional antenna 102 that includes an alignment calibration device 302 in a first position. The directional antenna 102 is in a fully operational mode when the alignment calibration device 302 is in the first position. The alignment calibration device 302 is attached to a linear actuation device 304. The linear actuation device 304 can be a pneumatic device or a motorized device, in various embodiments. The linear actuation device 304 moves the alignment calibration device 302 along an insertion line 306 into and out of the horn 204 through a selected one of the one or more side pieces 214 along a side of the housing 206. The selected side piece can have a slit or opening 312 through which the alignment calibration device 302 can be inserted. In an embodiment, the housing 206 can include two half side pieces which are held at a separation distance between them to form the slit or opening 312.

The alignment calibration device 302 includes a light source 308 at a first device end and a reflecting surface 310 at a second device end. The light source 308 and the reflecting surface 310 can be aligned along the insertion line 306. With the alignment calibration device 302 in the first position, the reflecting surface 310 is outside of the housing 206 or at least away from the beam axis 212 so as not to interact with an electromagnetic wave generated by the transducer 202.

Figure 4:
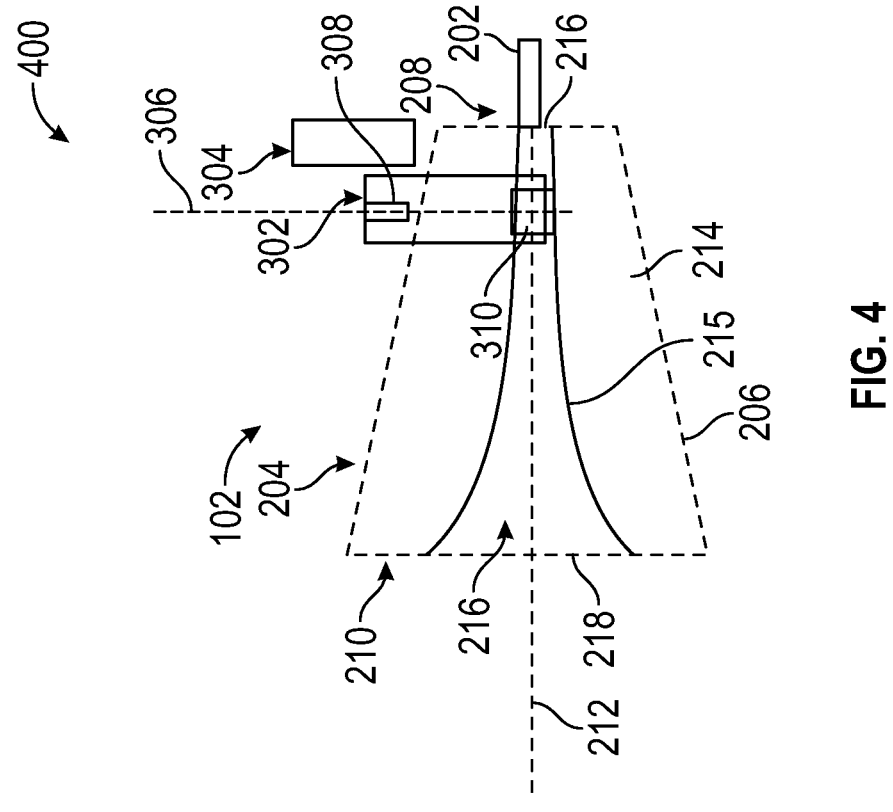
FIG. 4 shows a side cross-sectional view of the directional antenna with the alignment calibration device in a second position.

FIG. 4 shows a side cross-sectional view 400 of the directional antenna 102 with the alignment calibration device 302 in a second position. The directional antenna 102 is in a calibration mode when the alignment calibration device 302 is in the second position. In the second position, the alignment calibration device 302 is disposed in the horn 204 so that the reflecting surface 310 is located at the beam axis 212. The light source 308 may or may not be within the housing 206. In the second position, at least a part of the alignment calibration device 302 (i.e., the second device end having the reflecting surface 310) is within the housing 206. However, the entirety of the alignment calibration device 302 need not be disposed within the housing 206 when in the second position.

Figure 5:
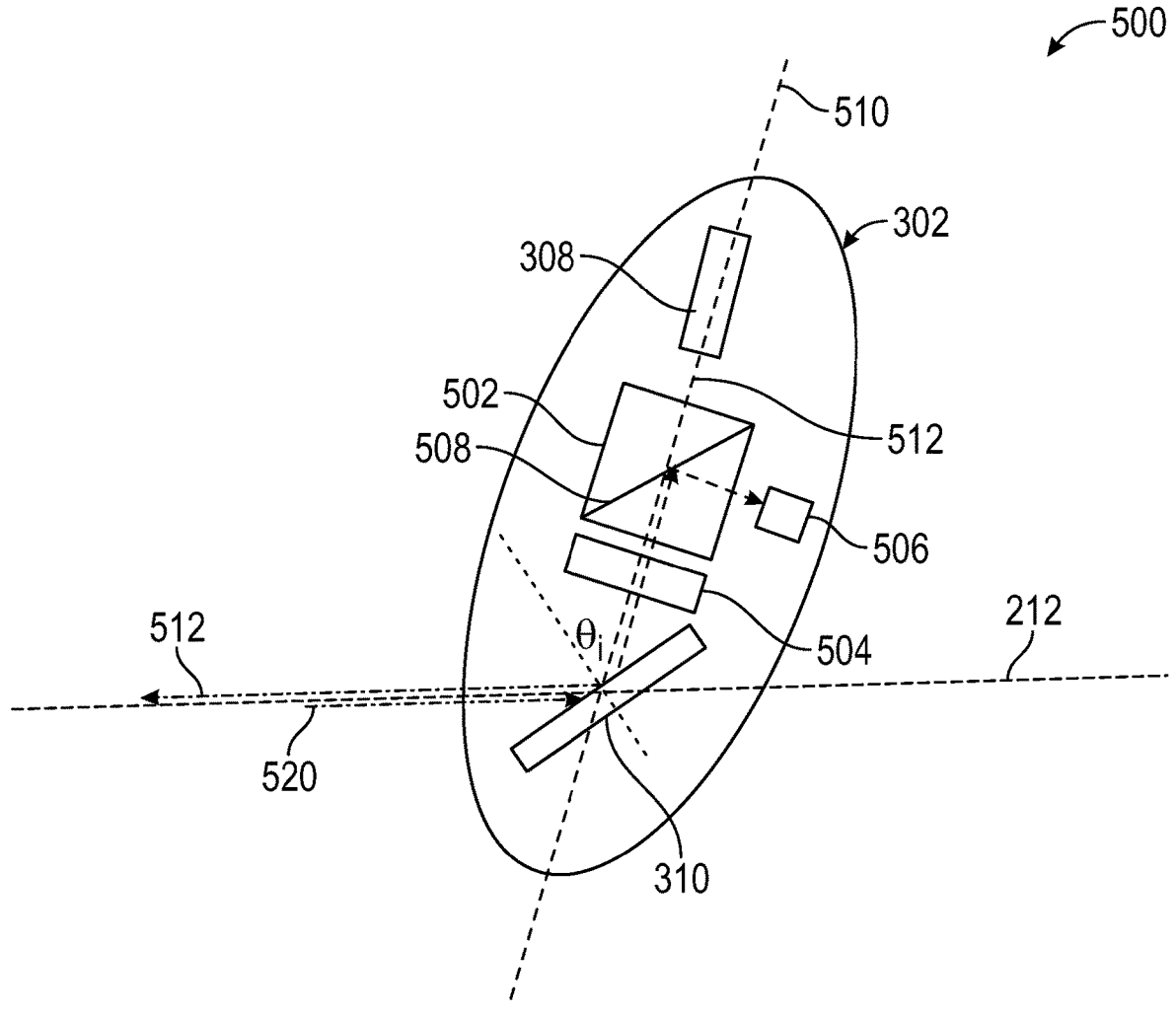
FIG. 5 is a detailed view showing components of the alignment calibration device, in an illustrative embodiment.

FIG. 5 is a detailed view 500 showing components of the alignment calibration device 302, in an illustrative embodiment. The alignment calibration device 302 includes the light source 308, a polarized beam splitter 502, a quarter wave plate 504, the reflecting surface 310 and a light sensor 506, such as a digital camera or charge-coupled device. In various embodiments, the light source 308 is a laser.

The light source 308, the polarized beam splitter 502, the quarter wave plate 504, and the reflecting surface 310 are aligned, in order, along a calibration beam axis 510. The calibration beam axis 510 can be aligned with the insertion line 306 (FIG. 3). The polarized beam splitter 502 includes a planar surface 508 that transmits P-polarized light and reflects S-polarized light. The reflecting surface 310 is made of a material with a low dielectric constant, such as, for example, glass or plastic.

Calibration is performed when the alignment calibration device 302 is in the second position. The light source 308 transmits a light beam 512 along the calibration beam axis 510 and into the polarized beam splitter 502. The light beam 512 enters the polarized beam splitter 502 with a P-polarization.

The planar surface 508 of the polarized beam splitter 502 is oriented at a 45-degree angle to the calibration beam axis 510. The polarized beam splitter 502 transmits the P-polarized light beam 512 through without reflection at the planar surface 508. The (P-polarized) light beam therefore passes into the quarter wave plate 504. At the quarter wave plate 504, the P-polarized light beam is converted to circularly polarized light. The circularly polarized light beam reflects off of the reflecting surface 310 and is directed along the beam axis 212 towards the device under test 112 (FIG. 1).

In an embodiment, the reflecting surface 310 is oriented so that the angle of incidence $\theta_i$ of the light beam 512 is about 70 degrees. At this angle of incidence, the reflecting surface 310 reflects about 17% of the incident light. Light from the reflecting surface 310 is transmitted along the beam axis 212 of the horn 204.

Figure 6:
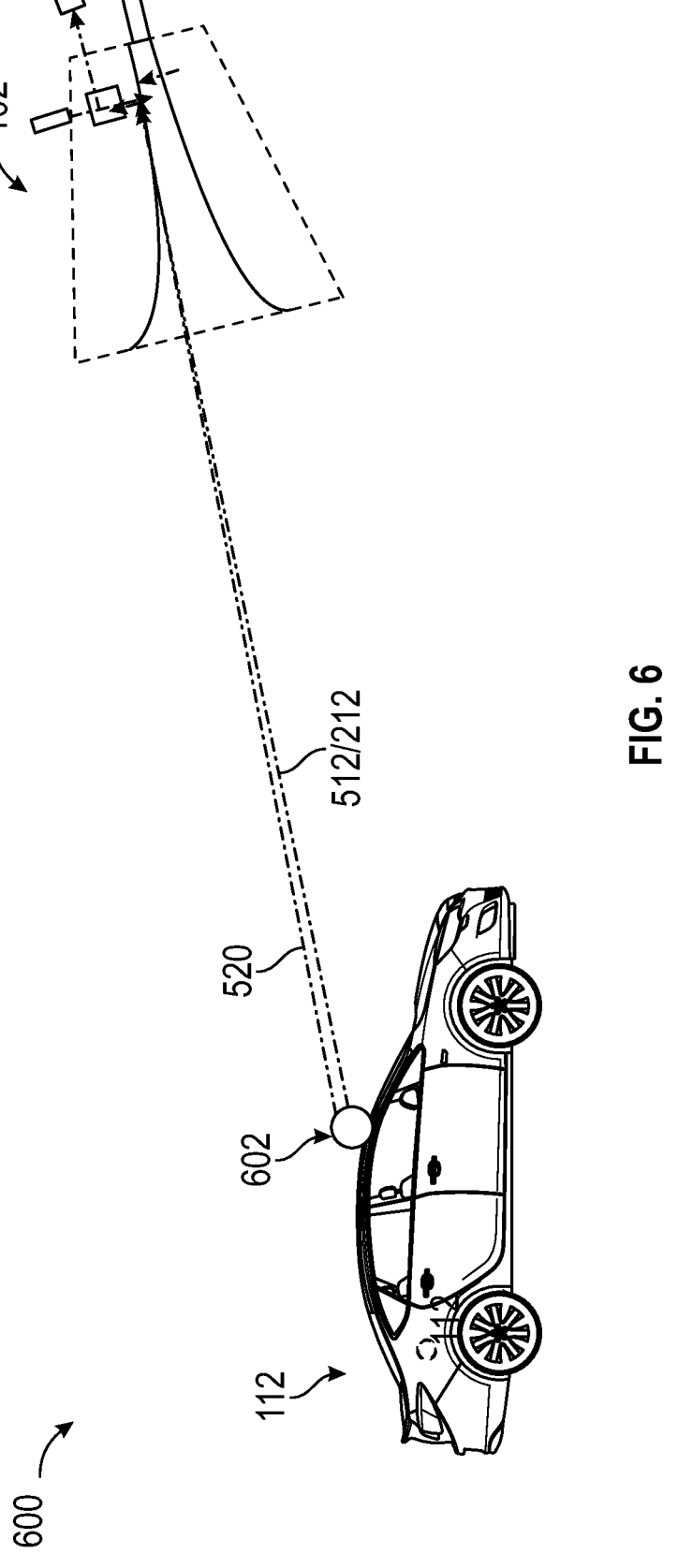
FIG. 6 shows a device under test placed at a testing location with respect to the directional antenna.

FIG. 6 shows a view 600 of the device under test 112 placed at a testing location with respect to the directional antenna 102. The light beam 512 propagating along the beam axis 212 of the directional antenna 102 is incident on the device under test 112. In one embodiment, an operator points the light beam 512 at the device under test 112 and adjusts the directional antenna 102 manually to make the light beam incident at a desired location of the device under test 112. This adjustment is performed by visually observing the light beam and manually adjusting the directional antenna 102 until the light beam is at the desired location. In another embedment, the light beam is made to be incident on a retroreflector 602. The retroreflector 602 directs a reflected beam 520 back to the directional antenna 102 along the beam axis 212. A pose parameter of the directional antenna 102 is adjusted so that the reflected beam 520 is incident at a selected or designated location at the light sensor 506 of the alignment calibration device 302.

Returning to FIG. 5, the reflected beam 520 is reflected at the reflecting surface 310 and into the quarter wave plate 504. The reflected beam 520 is circularly polarized, and the quarter wave plate 504 converts the reflected beam 520 to an S-polarized beam. The S-polarized beam then travels to the polarized beam splitter 502, where it is reflected by the planar surface 508 to propagate away from the calibration beam axis 510 and into the light sensor 506. The light sensor 506 records the reflected beam 520 and provides suitable data to the processor 114.

The processor 114 determines an adjustment to the directional antenna 102 to center the reflected beam 520 at the light sensor 506. In one embodiment, the processor 114 can determine a location of the reflected light beam at the light sensor 506 and make adjustments to the directional antenna 102 to move the to a desired location at the light sensor 506.

Figure 7:
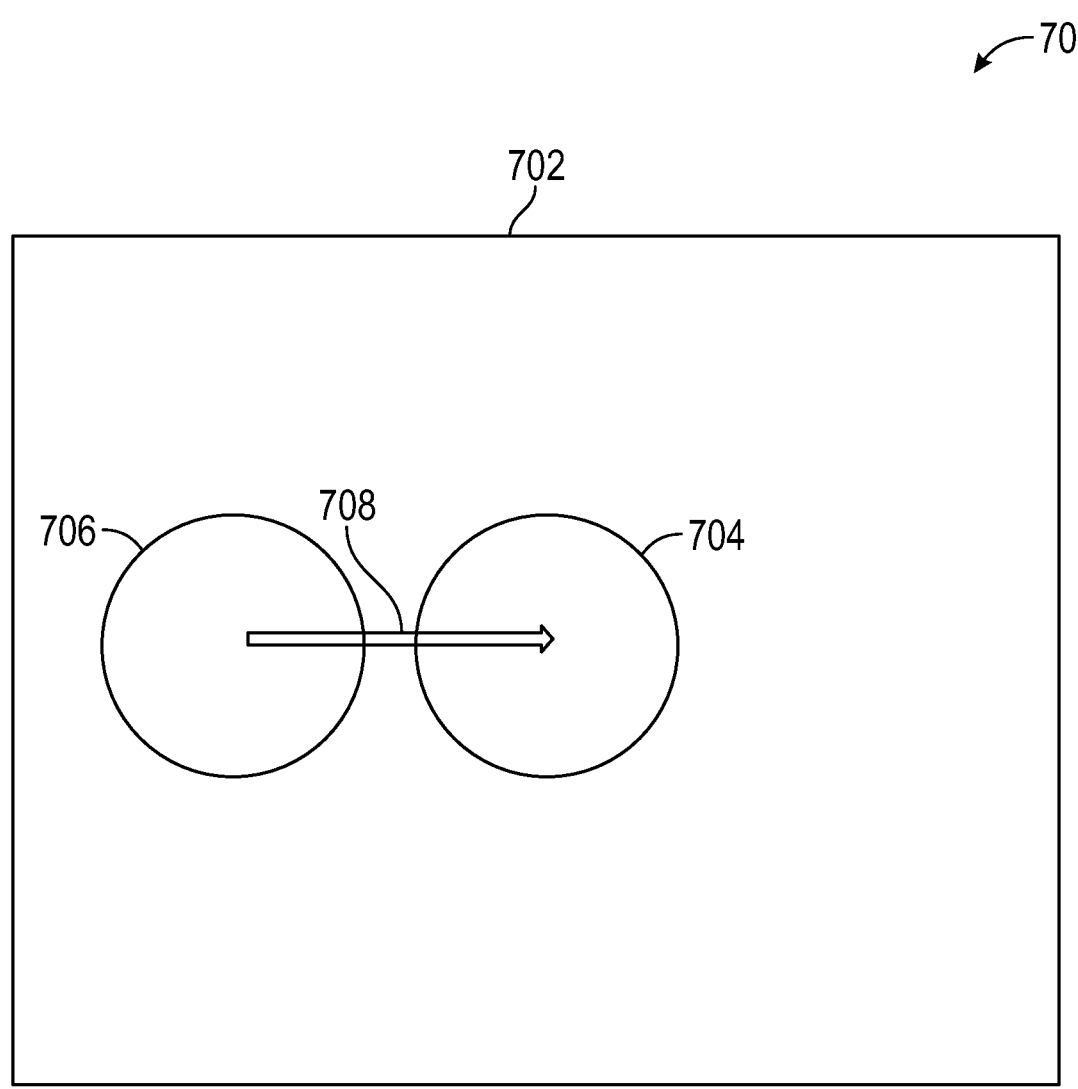
FIG. 7 shows a sensor plane of a light sensor in an illustrative embodiment.

FIG. 7 shows a sensor plane 700 of the light sensor 506 in an illustrative embodiment. The sensor plane 700 includes a light-sensitive array 702. A desired array position 704 of the light beam and an actual array position 706 of the light beam are shown. The processor 114 can determine a correction (as indicated by arrow 708) suitable for aligning the actual array position 706 with the desired array position 704. The correction can be used to adjust a pose parameter of the directional antenna 102.

In another aspect, a time-of-flight of the light beam can be measured for calibration purposes. The light beam can be provided as a pulse of light in order to facilitate time-of-flight measurements. The time-of-flight measurements can be used to compute a distance to the retroreflector 602 (and thus the device under test 112), which can be used to confirm the position of the directional antenna 102. The time-of-flight measurements can be used when processing antenna measurements obtained at different locations to correct for the path loss of the electromagnetic wave through air that occurs at these different locations. Given that the distance between the directional antenna 102 and the device under test 112 can have meaningful effects on the path loss, especially at higher test frequencies, this aspect allows for correction and processing with higher fidelity.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of adjusting an alignment of a directional antenna, comprising:
moving a reflecting surface from a first position away from a beam axis of a horn of the directional antenna to a second position along the beam axis;
transmitting a light beam from a light source to be incident on the reflecting surface, wherein the light beam reflects at the reflecting surface to project along the beam axis to a device under test; and
adjusting the alignment of the directional antenna to place the light beam at a desired location of the device under test.

2. The method of claim 1, further comprising
receiving a reflection of the light beam from the device under test at the reflecting surface;
directing the reflection via the reflecting surface to a light sensor; and
adjusting the alignment based on an actual array position of the reflection of the light beam at the light sensor.

3. The method of claim 2, further comprising measuring the actual array position within a light-sensitive array of the light sensor and adjusting a pose parameter of the directional antenna to move the actual array position to a desired array position within the light-sensitive array.

4. The method of claim 2, further comprising measuring a time-of-flight of the light beam and determining a path loss for an electromagnetic wave in air received from the device under test based on the time-of-flight.

5. The method of claim 1, wherein the reflecting surface and the light source are included in an alignment calibration device, further comprising inserting at least a part of the alignment calibration device through an opening in a housing of the horn.

6. The method of claim 1, wherein the directional antenna is coupled to a mounting stage, further comprising adjusting at least one of a translational parameter of the directional antenna and a rotational parameter of the directional antenna at the mounting stage.

7. The method of claim 6, wherein the mounting stage is coupled to a mast, further comprising adjusting a vertical position of the directional antenna by moving the mounting stage vertically with respect to the mast.

8. An antenna assembly, comprising:
a directional antenna including a horn having a housing having a side piece with an opening;
a reflecting surface movable through the opening from a first position away from a beam axis of the directional antenna to a second position along the beam axis;
a light source configured to transmit a light beam to be incident on the reflecting surface, the light beam reflecting at the reflecting surface to project along the beam axis to a device under test; and
a mounting stage for adjusting an alignment of the directional antenna to place the light beam at a desired location of the device under test.

9. The antenna assembly of claim 8, further comprising a light sensor, wherein a reflection of the light beam from the device under test is directed from the reflecting surface to the light sensor and the mounting stage adjusts the alignment based on an actual array position of the reflection of the light beam at the light sensor.

10. The antenna assembly of claim 9, wherein the light sensor further comprises a light-sensitive array, the actual array position is determined within the light-sensitive array and a pose parameter of the directional antenna is adjusted to move the actual array position to a desired array position within the light-sensitive array.

11. The antenna assembly of claim 9, further comprising a processor configured to measure a time-of-flight of the light beam and determine a path loss for an electromagnetic wave in air received from the device under test based on the time-of-flight.

12. The antenna assembly of claim 8, further comprising an alignment calibration device that includes the reflecting surface and the light source, wherein at least a part of the alignment calibration device is insertable through the opening.

13. The antenna assembly of claim 8, wherein the mounting stage is further configured to adjust at least one of a translational parameter of the directional antenna and a rotational parameter of the directional antenna.

14. The antenna assembly of claim 13, wherein the mounting stage is coupled to a mast and is further configured to move vertically with respect to the mast to adjust a vertical position of the directional antenna.

15. A testing system, comprising:
a device under test;
a directional antenna at a location with respect to the device under test, the direction antenna including a horn having a housing having a side piece with an opening;
a reflecting surface movable through the opening from a first position away from a beam axis of the directional antenna to a second position along the beam axis;

a light source configured to transmit a light beam to be incident on the reflecting surface, the light beam reflecting at the reflecting surface to project along the beam axis to the device under test; and a mounting stage for adjusting an alignment of the directional antenna to place the light beam at a desired location of the device under test.

16. The testing system of claim 15, further comprising a light sensor, wherein a reflection of the light beam from the device under test is directed from the reflecting surface to the light sensor and the mounting stage adjusts the alignment based on an actual array position of the reflection of the light beam at the light sensor.

17. The testing system of claim 16, wherein the light sensor further comprises a light-sensitive array, the actual array position is determined within the light-sensitive array and a pose parameter of the directional antenna is adjusted to move the actual array position to a desired array position within the light-sensitive array.

18. The testing system of claim 16, further comprising a processor configured to measure a time-of-flight of the light beam and determine a path loss for an electromagnetic wave in air received from the device under test based on the time-of-flight.

19. The testing system of claim 15, further comprising an alignment calibration device that includes the reflecting surface and the light source, wherein at least a part of the alignment calibration device is insertable through the opening.

20. The testing system of claim 15, wherein the mounting stage is further configured to adjust at least one of a translational parameter of the directional antenna and a rotational parameter of the directional antenna.

* * * * *